United States Patent [19]

Erickson

[11] Patent Number: 4,817,509
[45] Date of Patent: Apr. 4, 1989

[54] AIR FRYER

[75] Inventor: Chad S. Erickson, Plymouth, Minn.

[73] Assignee: Alternative Pioneering Systems Inc., Minneapolis, Minn.

[21] Appl. No.: 14,997

[22] Filed: Feb. 17, 1987

[51] Int. Cl.4 .............................................. A47J 27/00
[52] U.S. Cl. ...................................... 99/330; 99/447; 99/476; 219/370; 219/386; 219/400
[58] Field of Search .................. 99/330, 385, 401, 447, 99/476; 219/370, 386, 400

[56] References Cited

U.S. PATENT DOCUMENTS

| | | |
|---|---|---|
| 1,986,088 | 1/1935 | Wild . |
| 2,408,331 | 9/1946 | Mills . |
| 2,523,796 | 9/1950 | Weeks ............................... 99/447 X |
| 2,898,437 | 8/1959 | McFarland . |
| 2,949,524 | 8/1960 | Scarioni . |
| 2,957,067 | 10/1960 | Scofield . |
| 3,077,530 | 2/1963 | Chase et al. . |
| 3,168,642 | 2/1965 | Savio . |
| 3,239,651 | 3/1966 | Silberman ...................... 219/400 X |
| 3,529,556 | 9/1970 | Barnes ............................... 99/447 X |
| 3,820,524 | 6/1974 | Buckell . |
| 3,828,760 | 8/1974 | Farber et al. . |
| 3,926,106 | 12/1975 | Deusing et al. . |
| 3,962,962 | 6/1976 | Anderson . |
| 3,978,843 | 9/1976 | Durth . |
| 4,010,341 | 3/1977 | Ishammar . |
| 4,010,349 | 3/1977 | Lee . |
| 4,039,776 | 8/1977 | Roderick . |
| 4,051,347 | 9/1977 | Obing . |
| 4,071,738 | 1/1978 | Jenn et al. . |
| 4,071,739 | 1/1978 | Jenn et al. . |
| 4,132,216 | 1/1979 | Guibert ............................... 99/447 X |
| 4,133,336 | 1/1979 | Smith . |
| 4,173,215 | 11/1979 | Bureau et al. . |
| 4,208,572 | 6/1980 | Melgaard . |
| 4,210,072 | 7/1980 | Pedrini . |
| 4,226,178 | 10/1980 | Geissler et al. . |
| 4,295,034 | 10/1981 | Assmann . |
| 4,350,874 | 9/1982 | Nishikawa . |
| 4,374,318 | 2/1983 | Gilliom ............................ 99/447 X |
| 4,374,319 | 2/1983 | Guibert ............................ 219/400 |
| 4,375,184 | 3/1983 | Gilliom . |
| 4,426,923 | 1/1984 | Ohata . |
| 4,439,459 | 3/1984 | Swartley . |
| 4,455,924 | 6/1984 | Wenzel . |
| 4,460,822 | 7/1984 | Alden et al. . |
| 4,467,777 | 8/1984 | Weber . |
| 4,471,000 | 9/1974 | Brown et al. ..................... 219/400 |
| 4,484,063 | 11/1984 | Whittenburg et al. . |
| 4,491,065 | 1/1985 | Poulson . |
| 4,503,760 | 3/1985 | Pryputsch et al. . |
| 4,506,598 | 3/1985 | Meister . |
| 4,509,412 | 4/1985 | Wittenburg et al. . |
| 4,516,012 | 5/1978 | Smith . |
| 4,561,348 | 12/1985 | Halters et al. .................. 219/400 X |

OTHER PUBLICATIONS

*Rair* brochure, 1983.

*Primary Examiner*—John M. Jillions
*Attorney, Agent, or Firm*—Merchant & Gould

[57] ABSTRACT

Disclosed is a cooking device including a base member, a top member and a powered heater. The powered heater is disposed in an opening defined in the upper surface of the top. The base and the top may be hingedly interconnected. The powered heater provides air currents at a very high velocity to rapidly cook food materials, The motor and heater are easily removed for cleaning.

12 Claims, 4 Drawing Sheets

AIR FRYER

FIELD OF THE INVENTION

The present invention relates to cooking devices and more particularly to cooking devices using a high velocity air current to rapidly cook food product.

BACKGROUND OF THE INVENTION

A wide variety of cooking devices have been provided in the past. The conventional oven is illustrative of such cooking devices. Simple Ovens in various forms have been in use for centuries in homes, commercial bakeries, institutional kitchens and restaurants.

Conventional ovens have been provided in a variety of models and sizes, for example, a permanent, built-in style, mounted in cabinetry, together with or independent of a stove top unit. Conventional ovens have also been provided of a portable design. While the conventional oven remains a basic essential cooking unit in the home as well as restaurants or the like, conventional ovens do have their shortcomings. Conventional ovens, for example, tend to cook slowly and thus consume a good deal of the user's time.

Attempts have been made to overcome this problem; for example, microwave ovens have become popular. While microwave ovens cook rapidly, they too have their shortcomings. For example, it is difficult to brown food in a microwave oven.

Other attempts at solving the slowness of conventional ovens has been to include a circulating fan to move the air in the oven. While such circulating fans have provided more rapid cooking, the time required is still very substantial. Such existing ovens perform their tasks in a similar way. The majority of such cooking devices consist of a rectangular oven, usually equipped with a plurality of racks, much like that found in conventional in-home ovens. Often at the rear of the oven is a squirrel-cage type blower which draws the air through a hole in the interior rear wall and blows the air out to the sides, where is it directed to perforations in the two interior side walls. This pressurized air is then forced through the perforations toward the rear center of the oven enclosure, where it is drawn into the blower intake hole and re-circulated, thereby completing a closed loop. An oven produced by Rair follows the above pattern with the exception of circulating the air through a cylindrical chamber with its axis positioned horizontally.

Air velocities within the cooking chamber of such ovens vary widely, depending on the proximity to the blower intake and the air inlet holes. The velocities are generally the highest just in front of the blower intake. A typical average airspeed found in a commercial restaurant convection oven is approximately 350 feet per minute.

Various means of heating the air are used, usually employing natural gas heat exchangers in the sides of the oven or electrical tubular heating elements, like those found in conventional electric household ovens.

Another rapid cooking device has been the deep fat fryer. Such fryers are typically used to prepare French fries, breaded shrimp, fried chicken and the like. Deep fat fryers will typically cook food pieces in from one to five minutes. Deep fat fryers brown the product and develop desirable flavor characteristics. Deep fat fryers, however, also have inherent disadvantages. One such inherent disadvantage is the fact that the cooked food product has very high levels of fats, thus increasing the caloric content as well as the potential adverse effects on the consumer's circulatory system.

SUMMARY OF THE INVENTION

The present air fryer has a short, cylindrical cooking chamber with gentle radii in the upper and lower corners to facilitate smooth air flow around these corners. The round shape of the present chamber works with, rather than against the air flow. A conventional square or rectangular chamber, especially with sharp corners, offers great resistance to the smooth flow of air due to the abrupt change in directions of the air stream at each corner encountered. Turbulence is created in such conventional chambers as well as stagnant areas of relatively cool air in the corners. In order to overcome these problems, earlier forced air designs make use of large blowers and powerful motors to pressurize the air and force it as evenly as possible through the cooking chamber, usually through perforations or louvres in the interior walls of the cooking chamber. Such a high power solution is not practical when designing a lightweight portable appliance, due to the excessive noise, added cost and space requirements of such a design.

The present invention provides a solution to the various problems confronted by previous convection ovens as well as the deep fat fryers. The present invention provides very rapid cooking, develops browning and flavoring of the cooked product, and will provide products similar to those typically deep fat fried but with controlled oil content. The present invention includes a lower or bottom unit which has a circular circumferential wall and a lower integral wall. The lower unit has a rack on which the food pieces may be placed for cooking purposes. The unit includes a top portion which likewise has a circumferential wall and an integral top wall. An opening is defined in the central portion of the top wall into which a powered heater may be removably mounted. The powered heating unit heats an air stream and moves the air stream within the chamber defined by the lower unit and the upper unit at very high velocities, for example, in excess of 1,000 lineal feet per second, e.g., 2600 lineal feet per second.

The two portion may be hingedly connected so that the top may be pivoted upwardly to provide access to the rack. The hinged connection may provide a positive electrical disconnect to prevent operation of the blower or heating element when the top is pivoted upwardly.

The present air fryer enclosure is molded in high temperature plastic as two pieces, a top and a bottom. A single round wire or plastic rack is supported in the bottom half. The height of the rack may be adjusted up or down to meet the needs of different sized objects. In order to accommodate taller items such as loaves of bread, the user may add one or more extension rings between the upper and lower halves of the cooking enclosure. Extension segments may also be added to the hinge support assembly to match the extended height of the cooking enclosure.

By removing the rack and detaching the blower and hinge assembly, the cooking enclosure may be used as an oven-proof casserole dish or an attractive serving dish. With molded-in feet, the enclosure may be placed on the dining table without the need of a trivet.

The use of a plastic cooking enclosure provides a low thermal mass for rapid heat up and cool down, low thermal conductivity to slow heat loss and reduced risk of burns to the user, and lightweight for low cost shipping, easy portability and convenient use.

The present device has a transparent plastic top for clear observation of food while cooking, a low risk of breakage or cuts from broken pieces, and resistance to dents, chips, scratches or sharp edges found on painted metal parts.

IN THE DRAWINGS

DETAILED DESCRIPTION OF THE INVENTION

Figure 1:
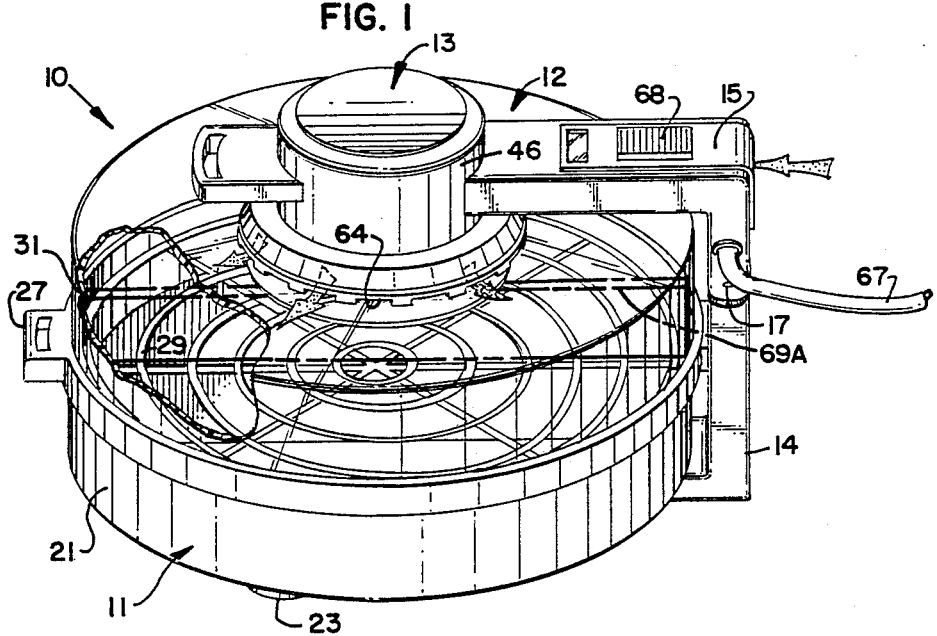
FIG. 1 is a perspective view of the cooking device of the present invention.

The cooking device 10 of the present invention, as illustrated in FIGS. 1 through 6, includes a base member 11, a top 12 and a powered heater unit 13. The heater unit 13 is in locked engagement with top 12 as hereinafter described. The cooking device 10 further includes a lower frame bracket 14 and an upper frame bracket 15 which are hingedly engaged such as by removable pin 17. The brackets 14 and 15 may be integrally secured to the base 11 and top 12 respectively, or alternatively, they may be removably secured such as by snap mechanism 18.

The base 11 may be suitably formed of a polymeric material preferably transparent and includes a circumferential wall 21, an integral lower wall 22 and a plurality of feet 23. The feet 23 serve to elevate the lower wall 22 upwardly from a support surface such as a countertop. The lower unit 11 may include a thickened upper rim 24 defining a slot 26 into which the top 12 may be lodged. The base 11 may further include a handle 27. The circumferential wall 21 further includes a plurality of small projections 28 which serve to support the rack 29 on which the food pieces may be disposed. The rack 29 may be of a conventional wire construction as illustrated in FIGS. 1 and 2.

The top 12 of the cooking unit 10 likewise includes a circumferential wall 31 and an upper wall 32. The wall 32 may be integral with wall 31; for example, produced by injection molding, or alternatively, vacuum molding. The upper wall 32 has an opening 32' defined therein for receipt of the powered heating unit 13. The opening 32' may be defined by rim 33 including a thickened vertical wall 35 and an inwardly-extending wall 36.

Figure 2:
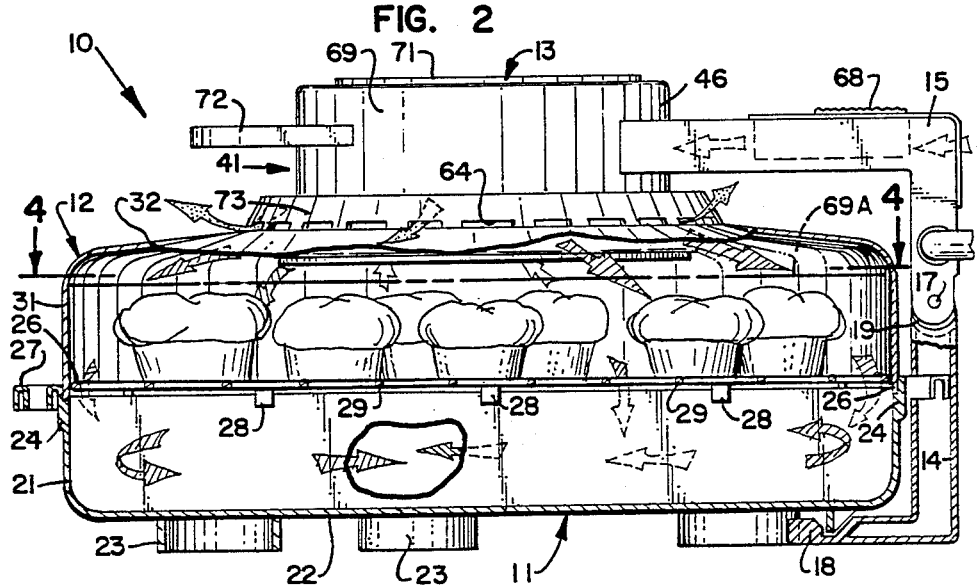
FIG. 2 is a cross-sectional view taken along the lines 2—2 in FIG. 1.
Figure 3:
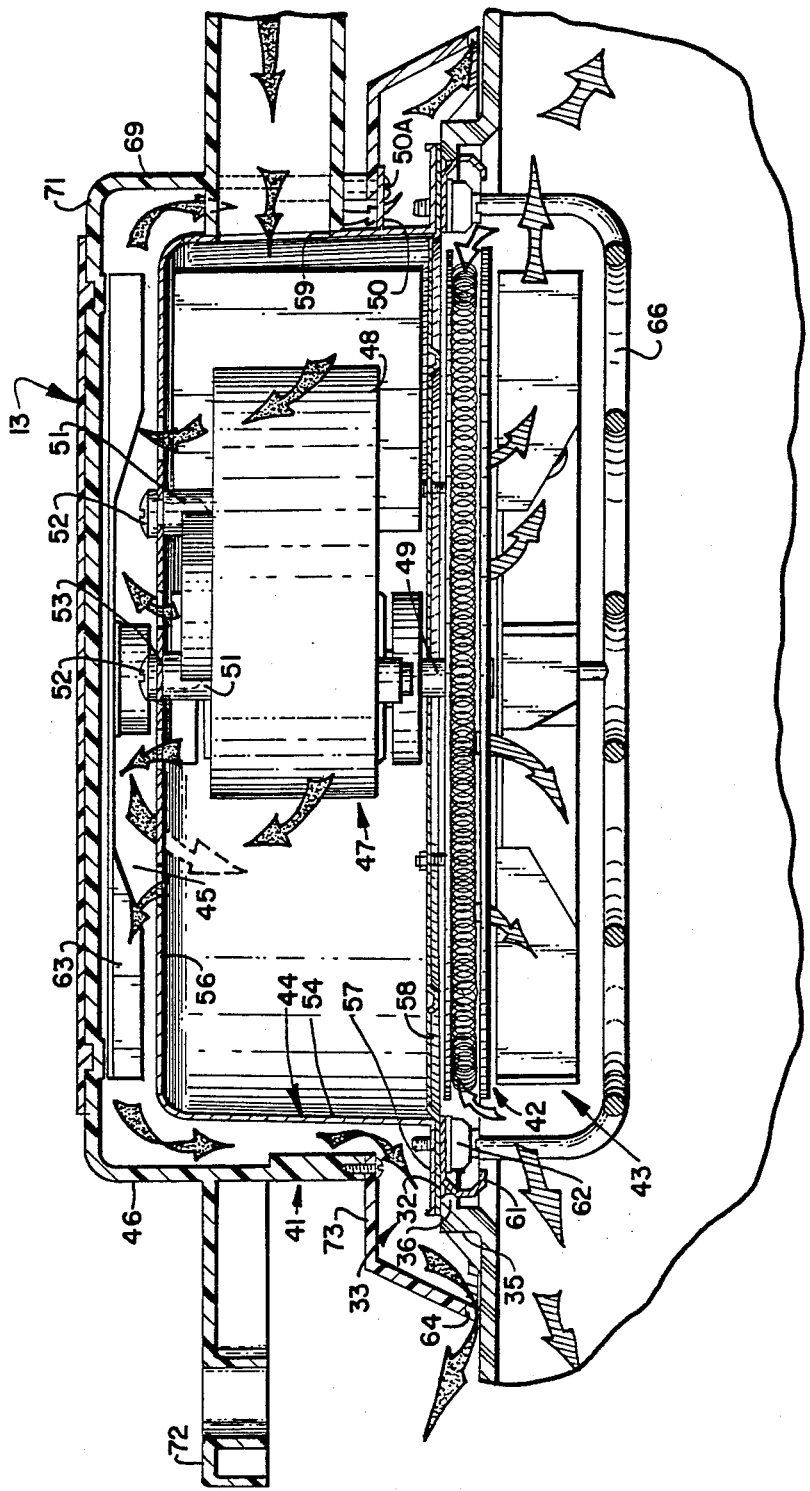
FIG. 3 is a cross-sectional view of the upper portion of the present invention showing the electric motor, resistance heating element and the blower blade taken along the lines 3—3 in FIG. 1.
Figure 4:
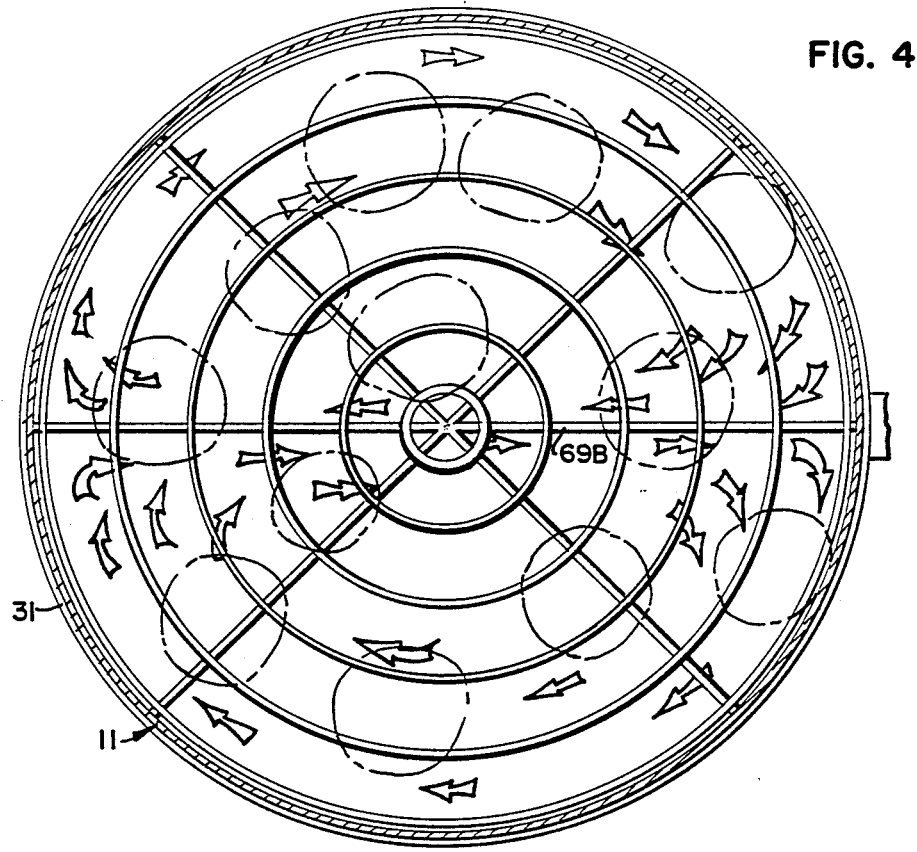
FIG. 4 is a view taken along the lines 4—4 in FIG. 2.
Figure 6:
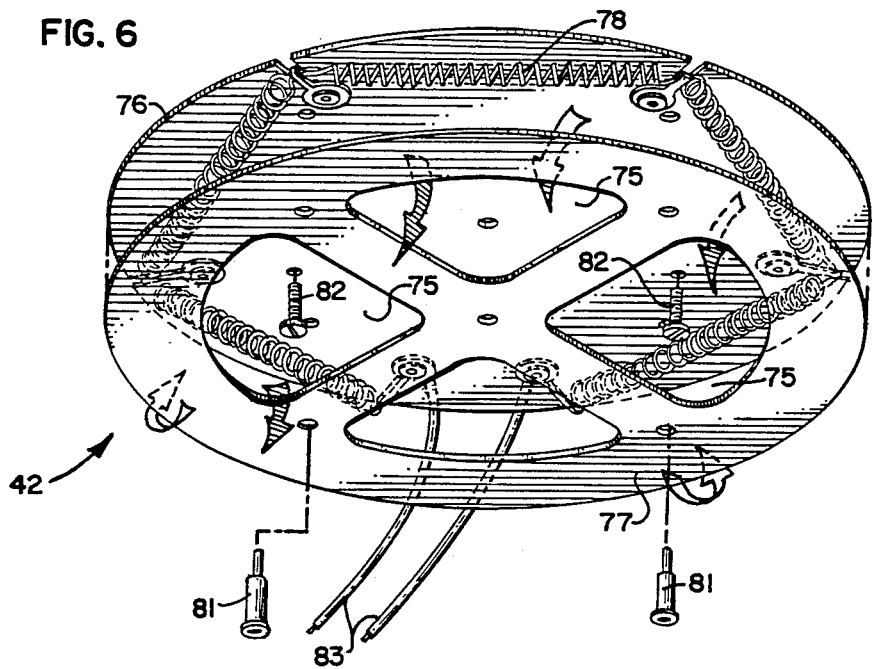
FIG. 6 is an exploded view of the heater unit as seen from beneath the unit.

The structure of the power heater unit 13 is illustrated in FIGS. 2, 3 and 6. The power unit 13 includes a motor portion 41, a heater 42 and a blower blade 43. The motor portion 41 includes an inner housing 44 which may be of sheet metal, an outer housing 46 which may be injection molded plastic and a motor 47, including an armature 48 and a rotatably driven shaft 49 which extends outwardly from each side of the armature. The motor 47 is mounted to the inner housing 44 such as by a plurality of bosses 51 and screws 52. The screws 52 extend through suitable openings 53 in the housing 44. The housing 44 includes a peripheral wall 54, an upper wall 56 and an outwardly-extending flange 57. The housing 44 is closed on the bottom side by plate 58. The plate 58 corresponds in dimension to the outer edge of the flange 57 such that the housing 44 rests on the rim 33 of top 12. The housing 44 has an opening 59 for receipt of air for purposes of cooling the armature 48 as hereinafter described.

A plurality of snap mechanisms 61 are attached by screws 62 at various locations around the periphery of the housing 44. The snap mechanism 61 may be of spring metal sheet and serves to secure the power unit 41 to the top 12. Alternatively, a twist lock type of securement may be used to attach the power unit 13 to the top 12.

The housing 46 has a peripheral wall 69 and an integral upper wall 71. A handle 72 may be molded as part of wall 69. The lower portion 73 of wall 69 may be flared radially outwardly and includes a plurality of openings 74 through which air may exit. The upper frame bracket 15 may be integral with wall 69. The housing 46 may be secured to housing 44 such as by flange 50 and screw 50a.

The heater 42 is an open coil, resistance wire type, and is thermostatically regulated to maintain cooking temperatures ranging from 150 to 450+ degrees F. The heater 42 as shown in FIG. 6 may include an upper plate 76, a lower plate 77 and a resistance coil 78. The plates 76 and 77 are of a material that does not conduct electrical current. The coil 78 is sandwiched between plates 76 and 77 and thus electrically insulated from the remainder of the cooking device. The lower plate 77 has a plurality of open zones 75 defined therein through which the heated air may move. The plates 76 and 77 may be secured together by rivets 81. Heater 42 may be secured to plate 58 by screws 82. The heater 42 is electrically connected to a source of power through wires 83, switch 68 and cord 67.

The open heater 78 coil is used in order to achieve the lowest possible surface watt density. With adequate air flow, such an element is capable of transferring maximum heat to the air stream via conduction, while operating in the "black" heat range. In order for other types of heating elements, such as tubular types, to give off the same wattage given the same space and airflow, the heater would glow. Such a high surface watt density would result in overheating of the motor blower, the food being cooked and plastic parts through an excessive radiation of heat. In addition, such an element would retain too much heat when the unit is shut off, causing additional overtemperature problems.

The heater assembly also incorporates an overtemperature device capable of shutting off power to the heater should the thermostat fail.

The power unit 13 includes an upper blade 63 which is mounted on shaft 49 of motor 47. The blade 63 draws fresh air through the upper portion of bracket 15 as illustrated by the arrows in FIG. 2. The blade 63 then moves this cool fresh air upwardly around the motor 41 to cool the motor, up through openings 45 in housing 44 and down and outwardly through the ports 64. The blower blade 43, which is mounted on the opposite end of shaft 49, moves the air currents within the heated chamber. The blade 43 has an open central portion which corresponds wit the open central portion 75 of the heater 42.

The blade 43 creates two air circulations. The first air circulation is throughout the heated chamber. The second air circulation passes a small portion of air over the heated coils in the heater 42 as illustrated in FIG. 3. In other words, the small air current exits radially outwardly from the blade 43, reverses direction 180 degrees to be drawn in over the coil 78, then radially inwardly to the center of the heater 42, then downwardly into the center zone of the blade 43. A protective grid 66 is provided over the blade 43.

Electrical current is fed into the device 10 by way of electric cord 67. The cord 67 may include a conventional plug for insertion into a wall socket. The electrical current passes through switch mechanism 68 mounted in the upper portion 15. The switch 68 includes a sensing mechanism to provide shutdown of the unit in the case of overheating in the heating chamber and/or motor housing 41. The switch mechanism 68 may also include sensing mechanism to shut down the unit if the top portion 12 is pivoted upwardly with the throw portion of the switch 68 in the "on" position.

OPERATION

Figure 5:
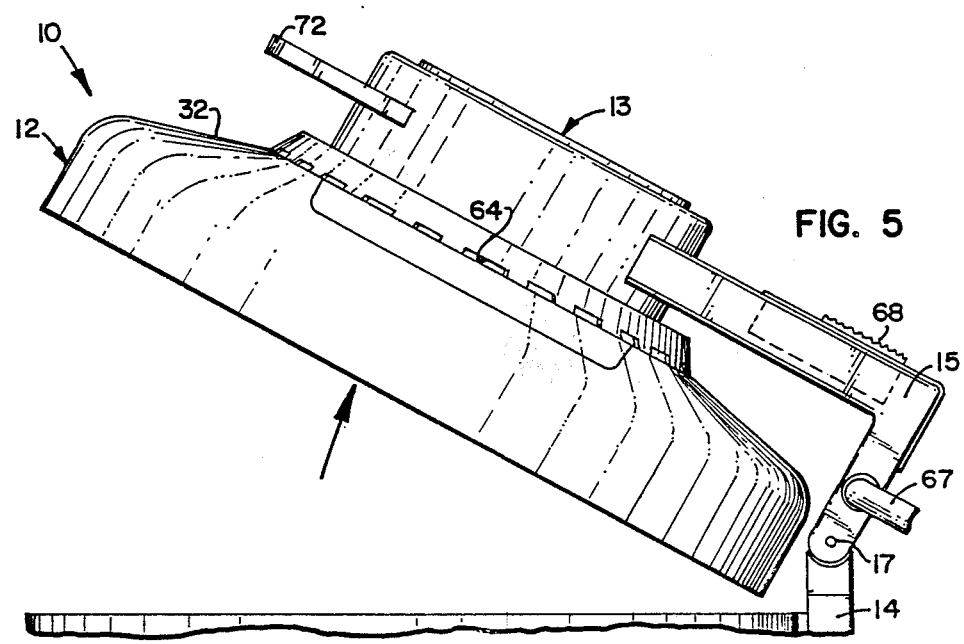
FIG. 5 is a fragmentary side view of the present invention showing the top portion pivoted upwardly.

Although the operation of the present invention is readily apparent from the afore description, it will be further described in order to provide a more complete understanding of the present invention. The present air fryer may be placed in operation by pivoting the top portion 12 upwardly as illustrated in FIG. 5. Food pieces such as potatoes, bakery goods, pizzas and the like may be placed on the rack 29. The top portion 12 is then pivoted downwardly to the position illustrated in FIGS. 1 and 2. The switch 68 is then activated turning the heating element 42 and the motor on. With the blade 43 rotating, air is moved within the chamber formed by the lower unit portion 11 and the upper portion 12. Air is circulated over the resistance coil thereby providing heat to such a chamber. The temperature will typically be in the range of 150–400 degrees F. If desired, a central wall 69a may be mounted in the heated chamber to provide a disturbance and thus greater turbulence within the heated chamber.

Unlike conventional devices, the blower is placed in the top center of the cooking chamber. The blower wheel is mounted in such a way as to project into the cooking chamber its upper surface being at the same level or lower than the upper wall of the chamber. In this position, the air thrown off the wheel travels parallel horizontally to the upper wall of the chamber until it is directed downward by the radius joining the upper wall and the vertical round side wall. The air then travels downward until it is again deflected at the base of the outside wall by the radius joining the side wall with the lower wall of the enclosure. The air is then simultaneously pushed and drawn by the blower across the top and beneath the cooking rack. As the air approaches the center of the enclosure, it is drawn up into the open underside of the blower wheel, where it is then recirculated through the same pattern described above.

The velocity of the air is not constant within the chamber, since the heated air converges as it moves to the center of the unit and is drawn into the blower. In the air fryer, the air cools as it contacts the food, but simultaneously accelerates as it converges on the center of the chamber. This change in velocity compensates for the dropping temperature by more effectively exchanging the heat remaining in the air. The result is very uniform cooking from the outer edge to the center of the cooking rack.

When cooking items that cover most of the cooking rack, such as a pizza, or that require a pan, such as cookies, airflow to the underside of the rack is prevented from being drawn back into the blower wheel. The trapped air swirls rapidly, but cools off significantly, due to inadequate air exchange with the heated air mass above the rack., To compensate for the above, one or more "mixing vanes" 69B may be located diagonally under the cooking rack. This causes the air to form two or more counter-rotating air masses that dramatically improve the air exchange under the rack. See FIG. 4.

Because the above system is capable of developing very rapid air flows with a minimum motor size and power input, it is desirable to equip the air fryer with an adjustable motor speed control. Some items, such as cakes or pizzas with loose topping, should not be exposed to overly high air speeds. When preparing such items, it is much preferred to reduce the air speed by dropping the motor speed. This results in a moderate extension of cooking time, but still provides much more rapid cooking than conventional ovens.

One of the important features found in the present invention is the position of the heater. As with any device that cooks a variety of foods, cleanability is a major concern. As a result of the rapid air movement found in most convection ovens, food particles, oil and grease are distributed over most interior surfaces of the oven. When these particles contact the heater in a convection oven, they burn, causing smoke, odor and cleaning problems. With the air fryer, such problems are largely eliminated due to the easy cleanability of the cooking enclosure and the design of the heater and its positioning.

The open coil heater 78 in the present invention is positioned directly above the blower wheel 43. The blower is fully open at the bottom, but also partially open on its top. As a result, the blower draws most of its make-up air into its bottom side, but also draws air into its top. This causes a portion of the air thrown out from the circumference of the blower to reverse direction and be drawn back through the heater perimeter, down through the open lower plate of the heater assembly and into the semi-open top of the blower wheel. This highly heated air is then mixed with the air being drawn in from the bottom of the blower. This mixture is then thrown out horizontally into the cooking chamber. This configuration provides the following advantages: Most particles are unable to make the abrupt 180 degree change in direction that the air drawn through the heater does. Therefore, the air traveling through the heater assembly is virtually free of contamination, while most particles are thrown off to the sides and bottom of the cooking chamber, where they can easily be cleaned away. As a result of the above, the heater does not accumulate food, oil or grease, thereby eliminating the need to clean the heater, extending heater element life and preventing smoke or fire hazard.

Positioning the heater immediately above the blower saves substantial space, and allows for the compact design of an easily-removed blower assembly. When the assembly is removed, the entire cooking enclosure can then be washed in a conventional household dishwasher. The compactness allowed by said heater position leaves more visibility through the top wall of the transparent cooking enclosure, providing the user with a maximum view of the cooking operation. Due to the blower wheel being located directly below the heater assembly, the blower wheel provides additional mechanical protection to the heater while further reducing the risk of electrical shock to the user.

Cleaning of any food preparation appliance is always a primary concern. The air fryer is designed to be easily disassembled, allowing the entire two piece cooking enclosure to be emersed in water for soaking or washing in a household dishwasher. The enclosure is molded of low-stick plastic capable of withstanding the maximum internal operating temperature of 400 degrees F. The blower assembly contains all electrical components and easily mounts in the top half of the cooking enclosure by snapping in place by way of metal clips or screwing into place, much like the lid on a jar. The blower assembly is dimensioned to fit easily inside the cooking enclosure for storage, thereby saving on scarce kitchen storage space and reducing shipping and packaging expense.

The upper assembly is hingedly mounted on a detachable support which connects to the underside of the cooking enclosure. The cooking enclosure is opened by lifting up on the handle section 72 of the unit and hinging the entire assembly rearward until it stops in a vertical position. When the assembly is tilted rearward, an internal switch shuts off all power to the motor and heater, thereby eliminating any danger of injury due to contact with the moving blower.

Due to the extensive use of plastics and the need to keep assembly temperatures comfortable to the touch, internal cooling of the assembly is critical. The motor must also be kept within safe operating temperature limits.

To achieve the above objectives, the blower unit 42 has been designed to draw cool, room temperature air in from directly above the hinge area. Drawing air from this point avoids taking in hot air rising off of the cooking enclosure. This cool air is pulled through the rectangular segment connecting the motor enclosure to the hinge. This "duct" may also house electronic components that are heat sensitive or require cooling, such as triacs. From here, the air is drawn over the motor, up through a secondary blower wheel 63 directly above the motor and then exhausted downward around the outside walls of a "cup" 44 which surrounds the motor 48. This exhaust air is finally forced through a gap 74 separating the cooking enclosure and the bottom edge of the blower assembly. Here the air serves a valuable function of cooling the cooking enclosure plastic at its most vulnerable point, close to the heater assembly.

Any deformation of the blower mount area due to overtemperature trouble would render the cooking enclosure useless. Gussets may be molded into the blower mount area to act as stiffeners and cooling fins for the plastic.

When the blower is removed from the cooking enclosure, the user may then install optional attachments to convert the air fryer into a steamer, a corn popper or other application that would fit the configuration and features of the cooking enclosure.

I claim:

1. An air fryer comprising an upper member and a lower member, said members defining an enclosure having a circular horizontal cross section and an ovular vertical cross section, said lower member having disposed therein a rack for supporting food pieces to be cooked, said upper member having defined therein a central opening, said fryer further including a blower disposed in said upper member central opening, said blower being adapted to move a heated air current in said enclosure at a rapid velocity, means for heating said air current to a temperature in the range of 150 to 450 degrees F. whereby food pieces disposed on said rack are rapidly cooked, said blower and said heating means comprising a unit mounted in said opening, said unit being easily removed without disassembly of said unit for cleaning said upper and lower members.

2. The air fryer of claim 1 wherein said blower includes a motor disposed outside said enclosure and a blower wheel disposed within said enclosure.

3. The air fryer of claim 2 wherein said heating means comprise an open coil resistance wire heater, said heater being disposed within said enclosure immediately above said blower wheel.

4. The air fryer of claim 3 wherein said fryer includes means for moving a secondary air flow to cool said motor and the upper wall of said enclosure.

5. The air fryer of claim 4 wherein said secondary air means comprises an air duct for carrying air from a zone at the periphery of said enclosure to a zone adjacent the upper end of said motor, a housing surrounding said motor for carrying air from said duct along said motor thereby cooling said motor and means for directing said air from said jacket outwardly along the upper surface of said enclosure thereby cooling said motor and said enclosure upper surface.

6. The fryer of claim 3 wherein the air velocity in the cooking chamber of said enclosure is at least about 1,000 lineal feet per second.

7. The fryer of claim 6 wherein the air velocity in the cooking chamber is about 2600 feet per second.

8. The fryer of claim 3 wherein the air velocity is sufficient to maintain said coil wire heater in a black condition.

9. The air fryer of claim 2 wherein said blower and said enclosure include mounting means for securing said blower in said central opening, said mounting means comprising quick release screw mechanisms.

10. The air fryer of claim 9 wherein said mounting means includes switch mechanism that places said blower in operable mode when said blower is locked in said opening and places said blower in the inoperable mode when said blower is removed from said opening.

11. An air fryer comprising an enclosure having a circular horizontal cross section and an ovular vertical cross section, said enclosure being defined by an upper member and a lower member, said lower member having a grid-like tray supported therein for supporting food to be cooked, said upper member having defined therein a central opening, a power driven blower mounted in said central opening, said blower including a fan blade adapted to move an air current in said enclosure at a rapid rate, means for heating said air current to a temperature in the range of 150 to 450 degrees F. whereby food pieces disposed on said tray are rapidly cooked, said heating means being mounted on said blower immediately above said blade, said blower and said heating means being readily removable as a unit for cleaning of said upper and lower members.

12. A rapid cooking device comprising:
(a) a base comprising a circumferential wall and an integral lower wall, said base further including means for supporting a tray-like member spaced upwardly from said lower wall;

(b) a top comprising a circumferential wall and an integral upper wall, said upper wall having an opening defined therein;
(c) means for aligned engagement between said top and said base; and
(d) powered heater means for recirculating heated air at high velocities in said cooking device, said powered heater means being disposed in said upper wall, said powered heater means being removably mounted in said opening, said heater means including an electrically powered motor, a fan blade and an electrical resistance heater disposed between said blade and said motor, said resistance heater including a circular plate and a resistance coil supported on said plate, said plate defining an opening in the center thereof, said blade providing a pair of air currents, the first of said air currents extending from said blade to a zone immediately above said plate in heat transmitting contact with said resistance coil and downwardly though said opening, the second of said pair of air currents extending from said blade into the chamber defined by said base and said top, the second current being a cyclonic path of high velocity, said blade serving to mix said direct current and said second current as said currents move along said blade.

* * * * *

UNITED STATES PATENT AND TRADEMARK OFFICE
CERTIFICATE OF CORRECTION

PATENT NO. : 4,817,509

DATED : April 4, 1989

INVENTOR(S) : AIR FRYER

It is certified that error appears in the above-identified patent and that said Letters Patent is hereby corrected as shown below:

Column 2, line 44, change "second" to --minute-- (both instances).

Column 8, line 32, change "second" to --minute--.

Column 8, line 34, change "second" to --minute--.

Signed and Sealed this

Twenty-second Day of September, 1992

Attest:

DOUGLAS B. COMER

Attesting Officer    Acting Commissioner of Patents and Trademarks